(12) United States Patent
Koshimizu et al.

(10) Patent No.: US 11,151,952 B2
(45) Date of Patent: Oct. 19, 2021

(54) LIQUID CRYSTAL DISPLAY AND LIQUID CRYSTAL TELEVISION RECEIVER

(71) Applicant: SHARP KABUSHIKI KAISHA, Sakai (JP)

(72) Inventors: Osamu Koshimizu, Sakai (JP); Yoshitaka Matsui, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/633,033

(22) PCT Filed: Jul. 24, 2018

(86) PCT No.: PCT/JP2018/027719
§ 371 (c)(1),
(2) Date: Jan. 22, 2020

(87) PCT Pub. No.: WO2019/026694
PCT Pub. Date: Feb. 7, 2019

(65) Prior Publication Data
US 2020/0211485 A1    Jul. 2, 2020

(30) Foreign Application Priority Data
Aug. 4, 2017   (JP) .............................. JP2017-151640

(51) Int. Cl.
G09G 3/36        (2006.01)
G09G 3/34        (2006.01)
H04N 5/44        (2011.01)

(52) U.S. Cl.
CPC ............ *G09G 3/36* (2013.01); *G09G 3/3406* (2013.01); *H04N 5/44* (2013.01); *G09G 2320/0626* (2013.01); *G09G 2330/027* (2013.01)

(58) Field of Classification Search
CPC ............ G02F 1/133; G09G 2320/0626; G09G 2330/027; G09G 3/20; G09G 3/34;
(Continued)

(56) References Cited

U.S. PATENT DOCUMENTS

2004/0104908 A1   6/2004  Toyozawa et al.
2005/0071702 A1*  3/2005  Morisawa ............. G06F 1/3265
                                                            713/320
(Continued)

FOREIGN PATENT DOCUMENTS

JP    H10-010496 A    1/1998
JP    2000-330539 A   11/2000
(Continued)

*Primary Examiner* — Hong Zhou
(74) *Attorney, Agent, or Firm* — ScienBiziP, P.C.

(57) ABSTRACT

Provided is a liquid crystal display or the like that is able to achieve prevention of or recovery from an image sticking phenomenon in the liquid crystal display, while ensuring convenience for an operator of the liquid crystal display. The liquid crystal display includes a liquid crystal panel that displays an image, and a display control unit that controls display of a predetermined image to respond to image sticking on the liquid crystal panel. The liquid crystal display includes a selection receiving unit that receives a selection of a display mode from among a plurality of display modes in which the predetermined image is displayed, and the display control unit controls the display of the predetermined image in accordance with the display mode selected at the selection receiving unit.

8 Claims, 9 Drawing Sheets

(58) Field of Classification Search
CPC .......... G09G 3/3406; G09G 3/36; G09G 5/00; H04N 5/44; H04N 5/57
See application file for complete search history.

(56) References Cited

U.S. PATENT DOCUMENTS

| | | | |
|---|---|---|---|
| 2005/0110871 A1* | 5/2005 | Ida | H04N 5/70 348/173 |
| 2006/0012552 A1* | 1/2006 | Chiu | G09G 3/3611 345/87 |
| 2006/0125809 A1* | 6/2006 | Kim | G09G 3/3611 345/204 |
| 2007/0177058 A1* | 8/2007 | Jang | G09G 3/20 348/607 |
| 2008/0284719 A1* | 11/2008 | Yoshida | G02F 1/136209 345/102 |
| 2008/0316157 A1* | 12/2008 | Park | G09G 3/3611 345/89 |
| 2011/0175883 A1* | 7/2011 | Toyotaka | G02F 1/136213 345/211 |
| 2014/0125564 A1* | 5/2014 | Je | G09G 3/20 345/55 |
| 2015/0241939 A1* | 8/2015 | Im | H04N 21/4438 715/867 |
| 2018/0204528 A1* | 7/2018 | Miyazawa | G09G 3/20 |
| 2019/0333472 A1* | 10/2019 | Kim | G09G 3/20 |

FOREIGN PATENT DOCUMENTS

| | | |
|---|---|---|
| JP | 2004-045785 A | 2/2004 |
| JP | 2006-308982 A | 11/2006 |

\* cited by examiner

FIG. 3

RESPOND TO IMAGE STICKING/LIGHT SOURCE TURNING-ON AND TURNING-OFF MODES

[V] TURN ON LIGHT SOURCE MODULE    LUMINANCE 100%

[ ] TURN OFF LIGHT SOURCE MODULE

FIG. 4

RESPOND TO IMAGE STICKING/MULTISCREEN MODE

NOT RESPOND

RESPOND (VIEWING SCREEN: MOVE FOR GIVEN TIME)

RESPOND (VIEWING SCREEN: FIXED AT UPPER RIGHT)

RESPOND (VIEWING SCREEN: FIXED AT LOWER RIGHT)

RESPOND (VIEWING SCREEN: FIXED AT UPPER LEFT)

RESPOND (VIEWING SCREEN: FIXED AT LOWER LEFT)

LIQUID CRYSTAL DISPLAY AND LIQUID CRYSTAL TELEVISION RECEIVER

TECHNICAL FIELD

An aspect of the present invention relates to a liquid crystal display and a liquid crystal television receiver.

The present application claims priority based on Japanese Patent Application No. 2017-151640 filed in Japan on Aug. 4, 2017, the content of which is incorporated herein.

BACKGROUND ART

In recent years, liquid crystal displays (LCDs) using liquid crystal have been widely spread as displays of television receivers, display devices, or the like.

In a case where a liquid crystal display displays an identical image or a specific pattern over a long time, an array structure of molecules of liquid crystal is fixed at a specific location, and a phenomenon that contrast, a hue, or the like is different between the specific location and a display portion around the specific location, that is, an image sticking phenomenon occurs in some cases.

For a purpose of achieving prevention of and recovery from an image sticking phenomenon in a liquid crystal display, PTL 1 discloses a liquid crystal display including control means that displays, on a display screen, a pattern such as a checked pattern, in which dark displays and bright displays are mixed without being located densely.

CITATION LIST

Patent Literature

PTL 1: Japanese Unexamined Patent Application Publication No. 10-10496

SUMMARY OF INVENTION

Technical Problem

The liquid crystal display described in PTL 1 is configured to perform control so as to display the checked pattern or the like when the liquid crystal display shifts to a sleep mode state or an external switch that is operated by an operator of the liquid crystal display is turned on. Note that, the shift to the sleep mode state is executed, for example, in a case where a state in which the operator performs no operation on a computer connected to the liquid crystal display continues more than a given time.

Accordingly, in the liquid crystal display according to PTL 1, turning on the external switch is only the operation by which the operator can display the checked pattern or the like, and therefore it is difficult to select, through the operation by the operator, control of various types of display which correspond to use modes of the operator. Thus, the liquid crystal display according to PTL 1 has a problem that it is not convenient for the operator of the liquid crystal display.

In view of such circumstances, an aspect of the invention aims to provide a liquid crystal display and the like that are able to achieve prevention of or recovery from an image sticking phenomenon in the liquid crystal display, while ensuring convenience for an operator of the liquid crystal display.

Solution to Problem

A liquid crystal display according to an aspect of the invention is a liquid crystal display including: a liquid crystal panel that displays an image; a display control unit that controls display of a predetermined image to respond to image sticking on the liquid crystal panel; and a selection receiving unit that receives a selection of a display mode from among a plurality of display modes in which the predetermined image is displayed. The display control unit controls the display of the predetermined image in accordance with the display mode selected at the selection receiving unit.

Advantageous Effects of Invention

According to an aspect of the invention, a liquid crystal display or the like is provided in which prevention of or recovery from an image sticking phenomenon is achieved in the liquid crystal display, while ensuring convenience for an operator of the liquid crystal display.

BRIEF DESCRIPTION OF DRAWINGS

FIG. 3 is an explanatory view illustrating an example of an operation screen of light source turning-on and turning-off modes.

FIG. 4 is an explanatory view illustrating an example of an operation screen of a multiscreen mode.

DESCRIPTION OF EMBODIMENTS

Embodiment 1

Figure 1:
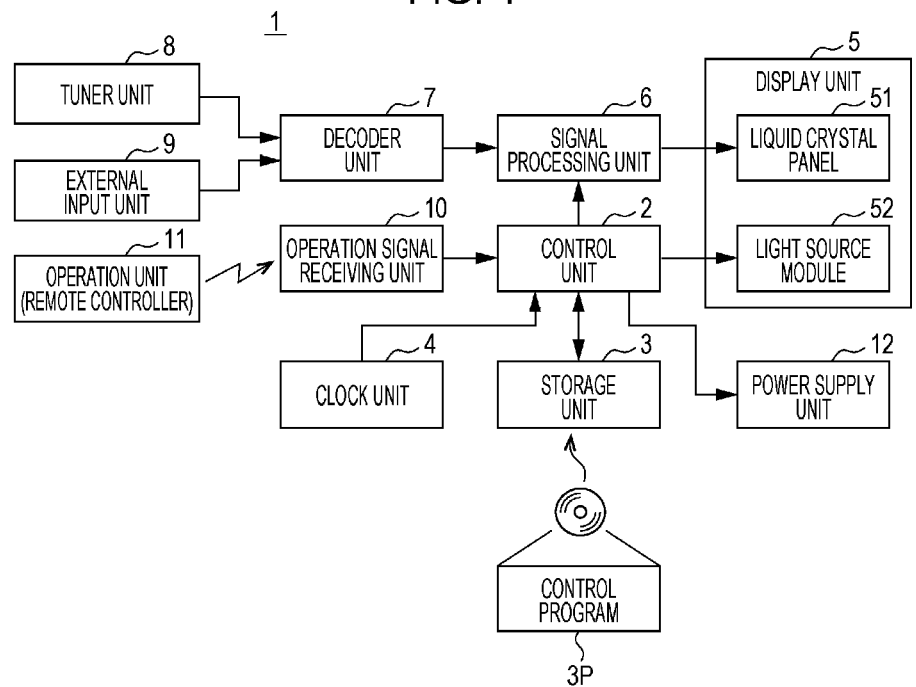
FIG. 1 is a block diagram illustrating a configuration of a liquid crystal display according to Embodiment 1.

The invention will be described below in detail with reference to figures illustrating an embodiment thereof. FIG. 1 is a block diagram illustrating a configuration of a liquid crystal display 1 according to Embodiment 1. The liquid crystal display 1 according to an aspect of the invention is a liquid crystal television receiver that includes a control unit 2, a storage unit 3, a clock unit 4, a power supply unit 12, a display unit 5, a signal processing unit 6, a decoder unit 7, a tuner unit 8, and an external input unit 9. Note that, the liquid crystal display 1 is not limited to the liquid crystal television receiver, and includes a display that displays a video signal input from the external input unit 9.

The control unit 2 is configured by a central processing unit (CPU) or a micro processing unit (MPU), directly or indirectly controls each of the units described above, and reads and executes a control program 3P and data, which are stored in the storage unit 3, to thereby perform various types of control processing, arithmetic processing, and the like. When executing the control program 3P, the control unit 2 corresponds to a display control unit and a selection receiving unit that will be described later. The clock unit 4 has a timer function and outputs information related to a date and time to the control unit 2.

The storage unit 3 is configured by a read only memory (ROM), an electrically erasable programmable ROM (EEPROM), or a nonvolatile memory device such as a flash memory, and has the control program 3P and data, which is to be referred to at a time of processing, stored in advance. The control program 3P stored in the storage unit 3 may be the control program 3P read from a recording medium which is readable by the liquid crystal display 1.

The tuner unit 8 is connected to an antenna that is not illustrated, receives and demodulates a video audio signal transmitted from a broadcasting station, and outputs the resultant to the decoder unit 7 via a selector unit that is not illustrated.

Devices such as those for reproducing, for example, video, a DVD, or the like are connected to the external input unit 9, and the external input unit 9 outputs a video audio signal, which is output from such reproducing devices, to the decoder unit 7 via the selector unit not illustrated.

The decoder unit 7 separates the input video audio signal into a video signal, an EPG signal, and an audio signal, and decodes the respective signals. The decoder unit 7 outputs the respective decoded signals to the signal processing unit 6.

The signal processing unit 6 performs processing for the video signal and EPG signal that are decoded and output from the decoder unit 7, generates a signal related to a video to be displayed on the display unit 5, and outputs the signal to the display unit 5. Moreover, the signal processing unit 6 generates, in accordance with a control signal that is related to video and is output from the control unit 2, a signal related to video to be displayed on the display unit 5, and outputs the signal to the display unit 5.

The display unit 5 includes a liquid crystal panel 51 that displays video and a light source module 52 that supplies light to the liquid crystal panel 51. The liquid crystal panel 51 and the light source module 52 are arranged in this order when viewed from a display surface side. The light source module 52 supplies light from a rear surface of the liquid crystal panel 51.

The liquid crystal panel 51 is configured so that liquid crystal is enclosed between substrates that face each other and, when a voltage is applied to a scanning electrode group and an information electrode group, an array structure (alignment direction) of molecules of the liquid crystal is changed. When the array structure of the molecules of the liquid crystal is changed, entered light is rotated and emitted or blocked. In a case where an alignment of the molecules of the liquid crystal is in a twisted nematic (TN) mode, when the alignment is in parallel to a rubbing direction, the light is transmitted and white is displayed. When the alignment is vertical to the rubbing direction, the light is not transmitted, and black is thus displayed. The liquid crystal panel 51 displays video in accordance with the signal that is related to the video and is output from the signal processing unit 6.

The light source module 52 is arranged on a rear surface side of the liquid crystal panel 51, supplies light from the rear surface, and illuminates the liquid crystal panel 51. The light source module 52 includes a directly-under type light source module and an edge-light type light source module. The light source module 52 of the directly-under type is configured such that a light source substrate, on a whole surface of which light sources such as light emitting diodes (LEDs) are mounted, is arranged on the rear surface of the liquid crystal panel 51. The light source module 52 of the edge-light type is configured such that a light guide is arranged on the rear surface of the liquid crystal panel 51 and a light source substrate, on a whole surface of which light sources such as LEDs are mounted, is arranged so as to face a side surface of the light guide. The light source module 52 adjusts light emission luminance of the light sources and emits light in accordance with a control signal that is related to luminance and is output from the control unit 2.

The power supply unit 12 rectifies or transforms electric power supplied from an external power supply not illustrated such as commercial power supply, and supplies the electric power to each of the units described above via an electric power line not illustrated. Moreover, the power supply unit 12 performs switching between on and off of power supply of the liquid crystal display 1 in accordance with a control signal that is related to on or off of the power supply and is received from the control unit 2. A state where the power supply is turned off includes a state where supply of electric power from the commercial power supply is completely shut off and a standby state. The standby state is a state where unnecessary power consumption is cut off to suppress power consumption and examples thereof include a state of waiting for an operation by an operator of the liquid crystal display 1 and a sleep state of waiting to execute certain control, which is set in advance, until given time comes.

The liquid crystal display 1 includes an operation unit 11 that is operated by the operator of the liquid crystal display 1 and an operation signal receiving unit 10 that receives an operation signal transmitted from the operation unit 11. The operation unit 11 is an input unit (not illustrated) that includes buttons, switches, or the like each of which is pressed by an operation by the operator, and a remote controller that outputs information related to the input operation by a signal such as a radio signal. However, the operation unit 11 is not limited to the remote controller, and may be buttons, switches, or the like each of which is provided in the liquid crystal display 1 itself. The operation signal receiving unit 10 receives the signal, such as a radio signal, which is output from the operation unit 11, and outputs the signal to the control unit 2.

The liquid crystal display 1 includes the display control unit and the selection receiving unit. The control unit 2 corresponds to the display control unit and controls display of a predetermined image to respond to image sticking on the liquid crystal panel 51. The display of the predetermined image is controlled by the control unit 2 executing the control program 3P.

The image sticking on the liquid crystal panel 51 is a phenomenon that, in a case where an identical image or a specific pattern is displayed over a long time, an array structure of molecules of liquid crystal is fixed at a specific location, and contrast, a hue, or the like is different between the specific location and a portion around the specific location. The predetermined image to respond to the image sticking on the liquid crystal panel 51 is, for example, an image in which a white color is displayed on the whole screen. When the image in which a white color is displayed on the whole screen is displayed for a given time, it is possible to prevent or recover from the image sticking on the liquid crystal panel 51. The given time for which the predetermined image is displayed is four hours, for example. Note that, the given time for which the predetermined image is displayed may be selected through an operation by the operator.

The control unit 2 outputs, to the signal processing unit 6, a control signal with which the predetermined image such as the image in which a white color is displayed on the whole screen is displayed. The signal processing unit 6 displays the predetermined image on the liquid crystal panel 51 of the display unit 5 in accordance with the control signal. In association with the display of the predetermined image, the control unit 2 outputs, to the light source module 52, a control signal with which light emission luminance is made maximum. In accordance with the control signal, the light source module 52 causes the light sources such as LEDs to emit light with the maximum or approximately maximum light emission luminance. When the light emission luminance is maximum or approximately maximum, it is possible to improve an effect of prevention of or recovery from the image sticking on the liquid crystal panel 51. Note that, a degree of the light emission luminance may be maximum at all times or may be set to be selectable through an operation by the operator.

The selection receiving unit includes a plurality of display modes in which the predetermined image to respond to the image sticking on the liquid crystal panel 51 is displayed, and allows the operator to select any of the display modes. The selection receiving unit is executed by the control unit 2 executing the control program 3P. A selection receiving screen on which selection by the operator is received is displayed on the display unit 5 by an operation on the operation unit 11 performed by the operator.

Figure 2:
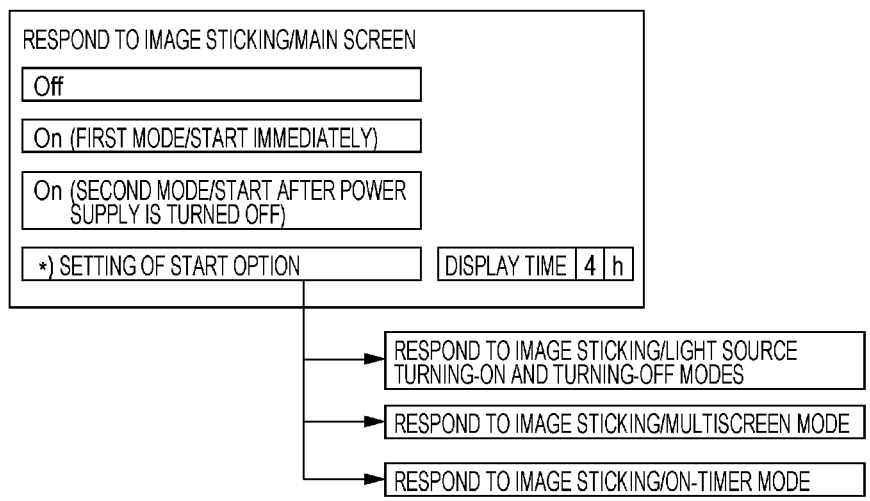
FIG. 2 is an explanatory view illustrating an example of a main screen of a selection receiving screen.
Figure 5:
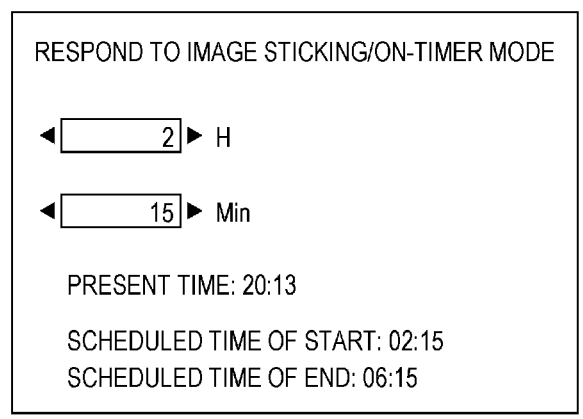
FIG. 5 is an explanatory view illustrating an example of an operation screen of an on-timer mode.

FIG. 2 is an explanatory view illustrating an example of a main screen of the selection receiving screen. FIG. 3 is an explanatory view illustrating an example of an operation screen of light source turning-on and turning-off modes. FIG. 4 is an explanatory view illustrating an example of an operation screen of a multiscreen mode. FIG. 5 is an explanatory view illustrating an example of an operation screen of an on-timer mode.

The plurality of display modes in which the predetermined image is displayed includes a first mode in which the display of the predetermined image is started immediately after the operator makes a selection, and a second mode in which the display of the predetermined image is started after the power supply of the liquid crystal display 1 is turned off. In the first mode, since the display of the predetermined image is started immediately after the operator makes a selection, the operator is not able to view normal video received by the tuner 8 or the like after the display of the predetermined image is started, but is able to prevent or recover from the image sticking early by starting the display of the predetermined image early.

In the second mode, since the display of the predetermined image is started after the power supply of the liquid crystal display 1 is turned off, it is possible to start the display of the predetermined image after the operator finished viewing the liquid crystal display 1. Accordingly, it is possible to prevent or recover from the image sticking while satisfying a desire for viewing by the operator. A state where the power supply of the liquid crystal display 1 is turned off includes the standby state. After the display of the predetermined image is ended, the control unit 2 may cause the liquid crystal display 1 to be in a state where supply of electric power from the commercial power supply is shut off.

As illustrated in FIG. 2, the selection receiving screen displays selection buttons of the first mode and the second mode to enable a selection by the operator. In the selection receiving screen, an off mode in which the display of the predetermined image is not executed may be selected. The selection receiving screen may be configured such that a time for which the predetermined image is displayed is able to be set.

The plurality of display modes in which the predetermined image is displayed includes the light source turning-on mode, the light source turning-off mode, the multiscreen mode, and the on-timer mode. As illustrated in FIG. 2, a start option button is provided in the selection receiving screen, and when the start option button is pressed, the light source turning-on mode, the light source turning-off mode, the multiscreen mode, and the on-timer mode are selectable as a submenu. However, a screen configuration is not limited thereto, and may be a configuration in which all the display modes are subject to menu display in the selection receiving screen so as to be selectable.

As illustrated in FIG. 3, in the operation screen of the light source turning-on and turning-off modes, a toggle switch is displayed so that the light source turning-on mode or the light source turning-off mode is selectable and the operator is able to make a selection. In a case where the light source turning-on mode is selected, the control unit 2 causes the light sources of the light source module 52 to turn on in association with the display of the predetermined image. When the light sources are turned on, it is possible to improve the effect of prevention of or recovery from the image sticking. In a case where the light source turning-off mode is selected, the control unit 2 causes the light sources of the light source module 52 to turn off in association with the display of the predetermined image. When the light sources are turned off, it is possible to reduce power consumption.

In a case where neither the light source turning-on mode nor the light source tuning-off mode is selected, when the above-described first mode is selected, the control unit 2 may also execute the light source turning-on mode, or when the second mode is selected, the control unit 2 may also execute the light source turning-off mode. In a case where the first mode is selected, by combining the first mode with the light source turning-on mode, the operator is able to easily and visually recognize that the display of the predetermined image is being executed. On the other hand, in a case where the second mode is selected, since a power supply switch of the display device is turned off and the operator does not have an intention to use the liquid crystal display 1, it is possible to suppress power consumption when the light source turning-off mode is used. Accordingly, it is possible to control the display of the predetermined image by automatically combining appropriate display modes according to an intention of the operator. A selection portion for the light emission luminance may be provided in the operation screen of the light source turning-on and turning-off modes so that the light emission luminance is able to be selected at predetermined luminance level in addition to the selection of the light source turning-on mode.

As illustrated in FIG. 4, the operation screen of the multiscreen mode is provided with selection buttons so that display forms of the multiscreen mode are selectable, and thereby allows a selection by the operator. The multiscreen mode is a mode in which a display region in which the liquid crystal panel 51 displays video is divided into a given number of regions, a normal screen (viewing screen) by a video signal from a tuner or the like is displayed in any of the divided regions, and the predetermined image to respond to the image sticking is displayed in the remaining region. The viewing screen is displayed even when the predetermined image to respond to the image sticking is being displayed, so that a desire for viewing by the operator is able to be satisfied.

In accordance with a selected display form of the multi-screen mode, the control unit 2 performs control so that the viewing screen is displayed in any of the regions and the predetermined image to respond to the image sticking is displayed in the remaining region. The display forms of the multiscreen mode include, for example, a form in which the display region is divided into four and the viewing screen is fixed in any of right, left, upper, and lower regions, and a form in which the viewing screen is moved (in rotation) in the right, left, upper, and lower regions for a given time. Note that, the display forms of the multiscreen mode are not limited thereto, and the dividing number may be any number such as two or six.

As illustrated in FIG. 5, the operation screen of the on-timer mode is provided with an input portion of time information, in which time to start the display of the predetermined image to respond to the image sticking is set. In accordance with the set time information, the control unit 2 starts the display of the predetermined image to respond to the image sticking. When the time to start the display of the predetermined image to respond to the image sticking is set to, for example, the middle of the night, it is possible to display the predetermined image in a time zone during which the operator does not view the liquid crystal display 1, thus improving convenience of the operator. Moreover, when the predetermined image is displayed in the middle of the night, it is possible to utilize a midnight electricity rate which is inexpensive.

The time information is not limited to time and includes information related to a date of a year, a month, and a day. A configuration may be provided such that the information related to a date of a year, a month, and a day is also able to be set in the operation screen of the on-timer mode. In accordance with the set time information, the control unit 2 may periodically start the display of the predetermined image to respond to the image sticking, for example, every Sunday or the like. A configuration may also be provided such that scheduled time of end, which is obtained by adding a time during which the predetermined image is displayed, is displayed in accordance with the set starting time.

The control unit 2 performs control to display the predetermined image, by combining two or more display modes, which are selectable in the selection receiving screen, without contradiction. Display on the selection receiving screen is not limited to display by the display unit 5, and, for example, a portable terminal (not illustrated) capable of communicating with the liquid crystal display 1 may be caused to display the selection receiving screen and a display mode selected on the selection receiving screen of the portable terminal may be transmitted to the liquid crystal display 1. Alternatively, the control unit 2 may perform control to display the predetermined image, by performing communication with a server (not illustrated), which is connected to the liquid crystal display 1 so as to be capable of communicating, via an external network (not illustrated) and acquiring a display mode which is set on a server side.

Figure 6:
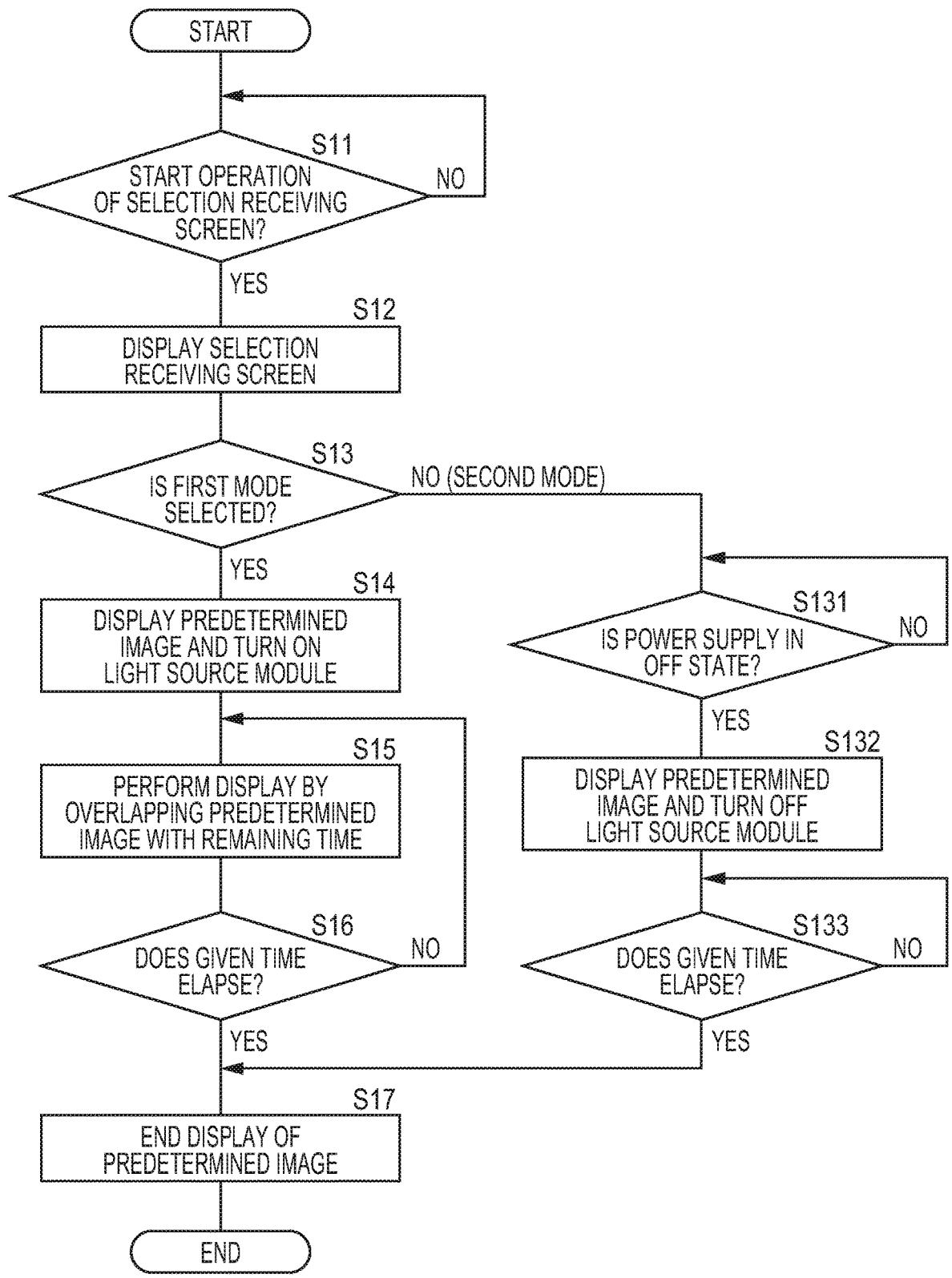
FIG. 6 is a flowchart illustrating a processing procedure according to Embodiment 1.
Figure 7:
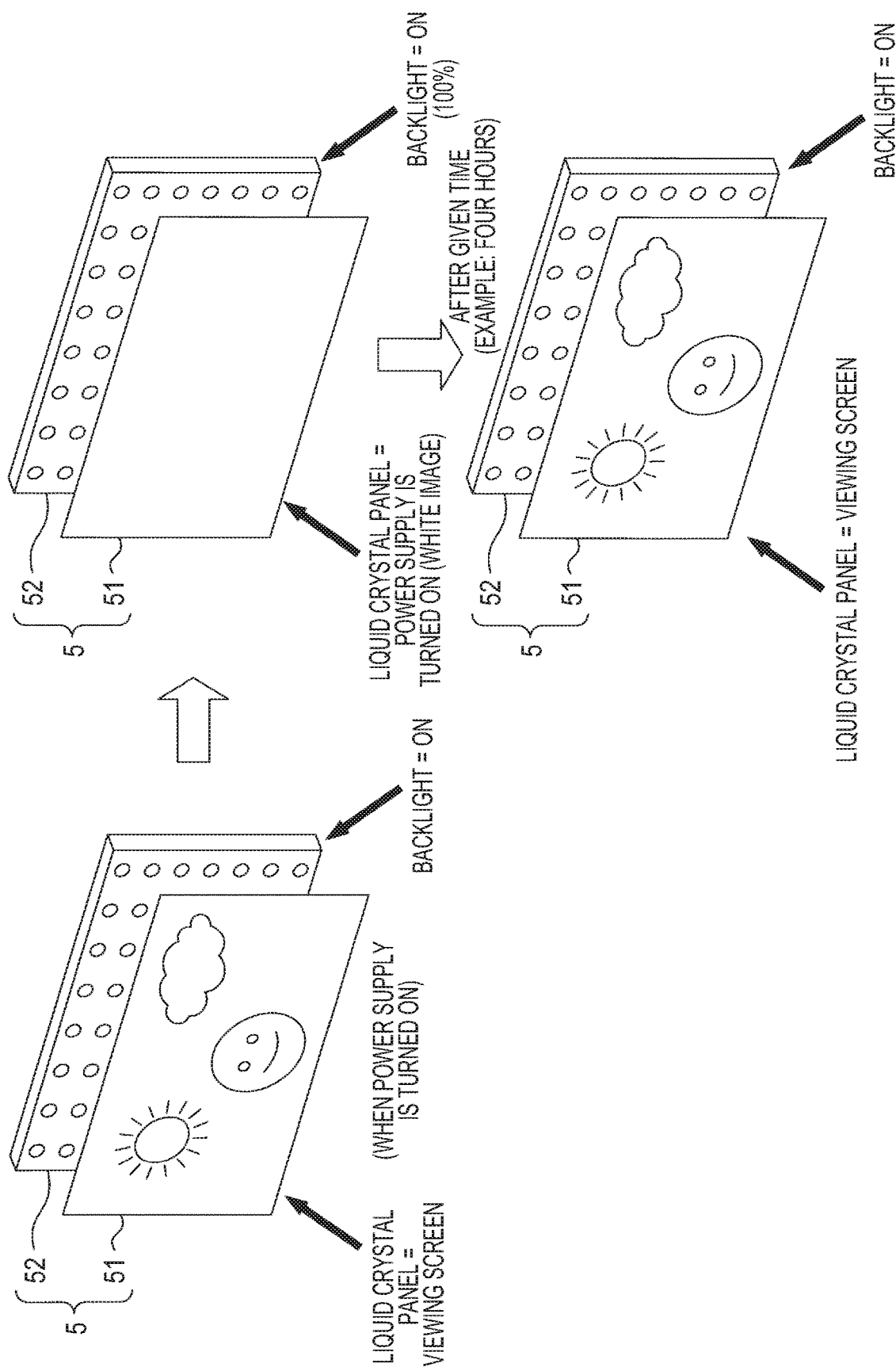
FIG. 7 is an explanatory view in a case of responding to image sticking in a first mode.
Figure 8:
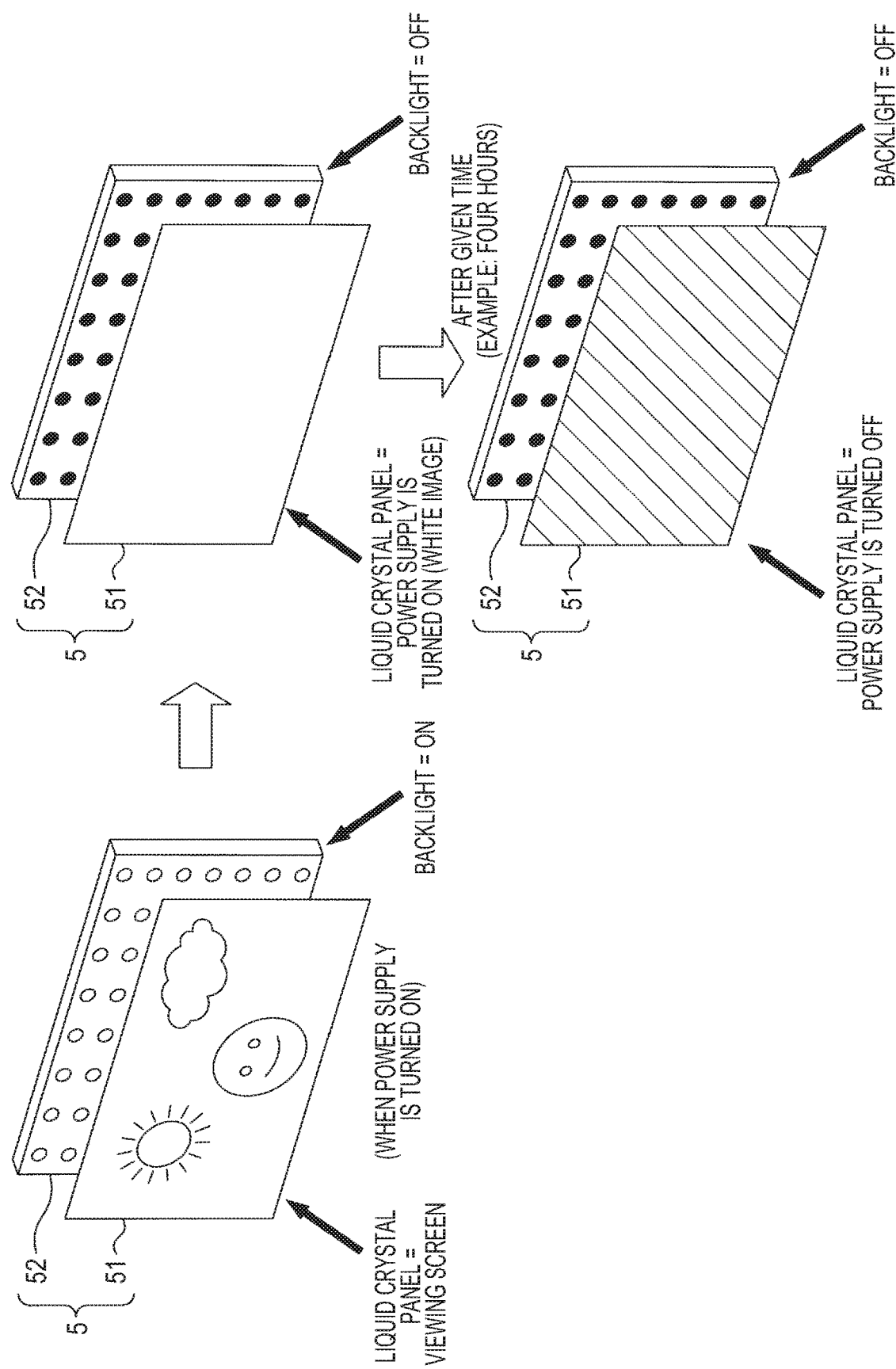
FIG. 8 is an explanatory view in a case of responding to image sticking in a second mode.

FIG. 6 is a flowchart illustrating a processing procedure according to Embodiment 1. FIG. 7 is an explanatory view in a case of responding to the image sticking in the first mode. FIG. 8 is an explanatory view in a case of responding to the image sticking in the second mode. The control unit 2 determines whether a start operation of the selection receiving screen is performed by an operator (S11). The start operation of the selection receiving screen by the operator is executed by, for example, pressing a predetermined button of the operation unit 11 or the like. When determining that the start operation is not performed (S11: NO), the control unit 2 performs loop processing in order to make the determination of S11 again.

When determining that the start operation is performed (S11: YES), the control unit 2 displays, on the display unit 5, the selection receiving screen in which a display mode of displaying the predetermined image to respond to the image sticking is selected (S12). The control unit 2 receives a selection operation from the operator, and determines whether the first mode is selected (S13).

When the first mode is selected (S13: YES), as illustrated in FIG. 7, the control unit 2 displays the predetermined image to respond to the image sticking and turns on the light source module 52 with maximum light emission luminance (S14). The control unit 2 performs display by overlapping the predetermined image, for example, with information related to a remaining time to display the predetermined image (S15). The remaining time is a time until the display of the predetermined image is ended and a time obtained by subtracting an elapsed time, which is from the start of the display to the present time, from a given time which is set in advance and for which the predetermined image is displayed. In accordance with the information related to time, which is output from the clock unit 4, the control unit 2 derives and displays the remaining time. Alternatively, the control unit 2 may display time at which the display of the predetermined image ends. The control unit 2 determines whether the given time elapses (S16). The given time is a time for which the predetermined image to respond to the image sticking is displayed, and, for example, four hours.

When determining that the given time does not elapse (S16: NO), the control unit 2 continues the display of the predetermined image and performs loop processing in order to perform the processing of S15 again. When determining that the given time elapses (S16: YES), the control unit 2 ends the display of the predetermined image (S17). After ending the display of the predetermined image, the control unit 2 displays the viewing screen on the display unit 5. Alternatively, the control unit 2 may turn off the power supply of the liquid crystal display 1.

When the first mode is not selected (S13: NO), that is, when the second mode is selected, the control unit 2 determines whether the power supply of the liquid crystal display 1 is turned off (S131). A state where the power supply of the liquid crystal display 1 is turned off includes the standby state. When determining that the power supply is not turned off (S131: NO), the control unit 2 performs loop processing in order to make the determination of S131 again.

When determining that the power supply is turned off (S131: YES), as illustrated in FIG. 8, the control unit 2 displays the predetermined image and turns off the light source module 52 (S132). The control unit 2 determines whether the given time elapses (S133).

When determining that the given time does not elapse (S133: NO), the control unit 2 continues the display of the predetermined image and performs loop processing in order to make the determination of S15 again. When determining that the given time elapses (S133: YES), the control unit 2 ends the display of the predetermined image (S17). After ending the display of the predetermined image, the control unit 2 turns off the power supply of the liquid crystal display 1.

Embodiment 2

Figure 9:
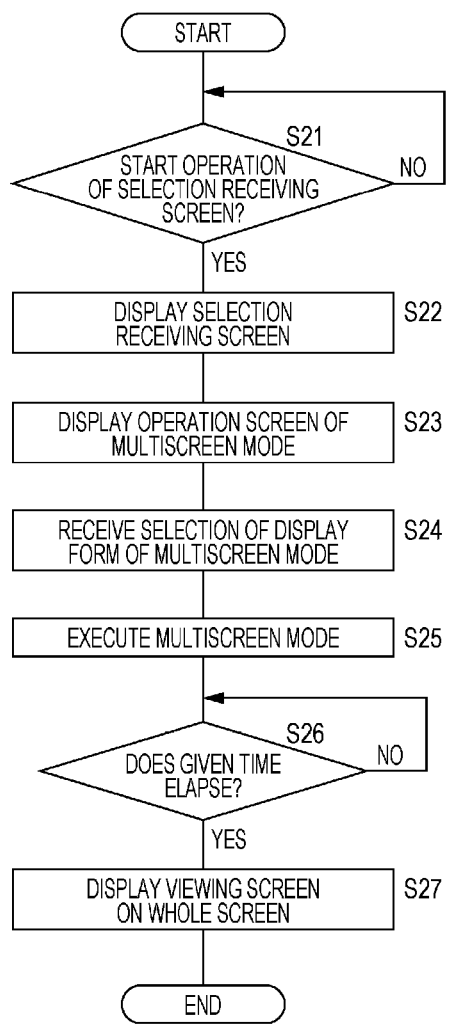
FIG. 9 is a flowchart illustrating a processing procedure according to Embodiment 2.

FIG. 9 is a flowchart illustrating a processing procedure according to Embodiment 2. Embodiment 2 is different from Embodiment 1 in that the predetermined image to respond to image sticking is displayed in the multiscreen mode. Similarly to the processing of S11 and S12 of Embodiment 1, the control unit 2 makes a determination about the start operation of the selection receiving screen (S21) and displays the selection receiving screen (S22).

For example, in response to an operation by an operator, such as pressing the start option button on the selection receiving screen as illustrated in FIG. 2, the control unit 2 displays the operation screen (selection receiving screen) of the multiscreen mode (S23). The control unit 2 receives a selection of a display form of the multiscreen mode, which is made by the operator (S24). In accordance with the selected display form of the multiscreen mode, the control unit 2 displays a normal screen (viewing screen) by a video signal from the tuner or the like in any of divided display regions, while displaying the predetermined image to respond to the image sticking (S25).

Similarly to the processing of S15 of Embodiment 1, the control unit 2 determines whether a given time elapses (S26). When determining that the given time does not elapse (S26: NO), the control unit 2 continues the display of the predetermined image and performs loop processing in order to make the determination of S26 again.

When determining that the given time elapses (S26: YES), the control unit 2 ends the display of the predetermined image and displays the viewing screen on the whole screen (S27). Note that, the display of the operation screen of the multiscreen mode is not limited thereto, and the operation screen of the multiscreen mode may be displayed by, for example, pressing a predetermined button of the operation unit 11, which is performed by the operator.

Embodiment 3

Figure 10:
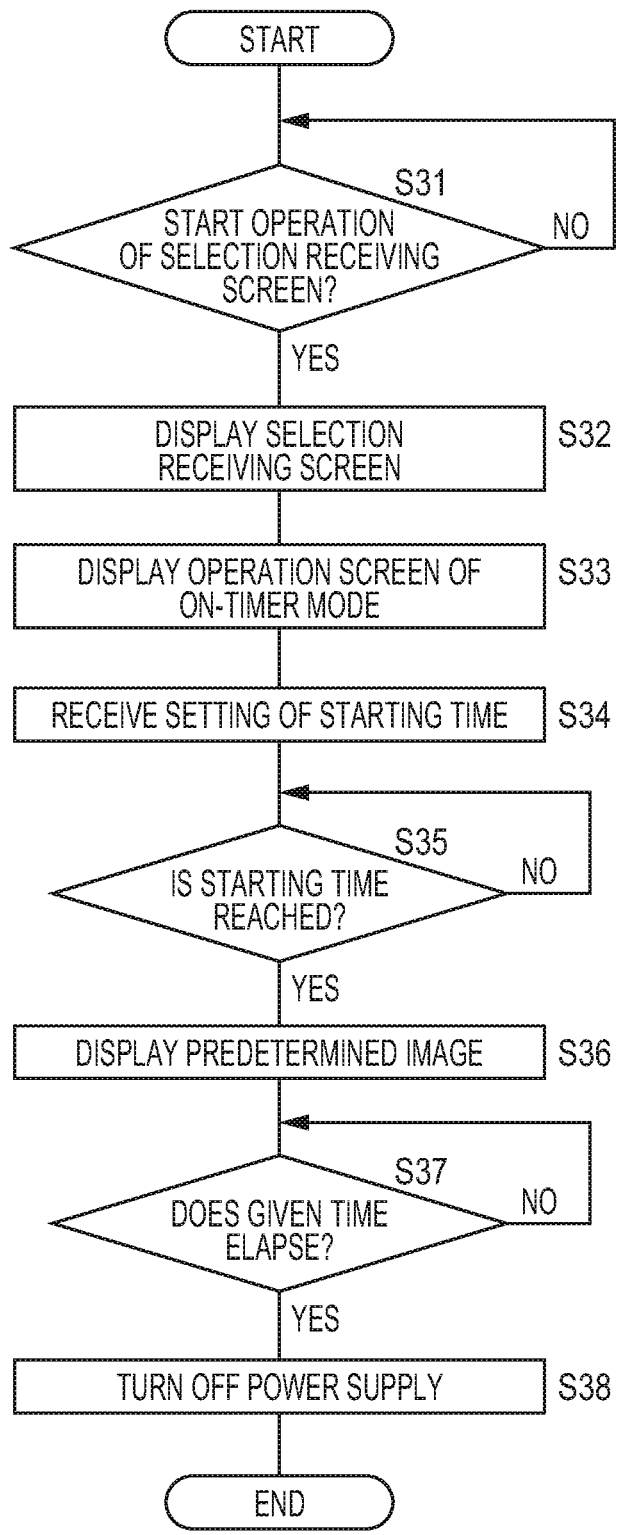
FIG. 10 is a flowchart illustrating a processing procedure according to Embodiment 3.

FIG. 10 is a flowchart illustrating a processing procedure according to Embodiment 3. Embodiment 3 is different from Embodiment 1 in that the predetermined image to respond to the image sticking is displayed in the on-timer mode. Similarly to the processing of S11 and S12 of Embodiment 1, the control unit 2 makes a determination about the start operation of the selection receiving screen (S31) and displays the selection receiving screen (S32).

For example, in response to an operation by an operator, such as pressing the start option button on the selection receiving screen as illustrated in FIG. 2, the control unit 2 displays the operation screen (selection receiving screen) of the on-timer mode (S33). The control unit 2 receives starting time of a predetermined screen, which is set by the operator (S34).

The control unit 2 determines whether the set starting time is reached (S35). When determining that the set starting time is not reached (S35: NO), the control unit 2 performs loop processing in order to make the determination of S35 again. When determining that the set starting time is reached (S35: YES), the control unit 2 displays the predetermined image (S36). The control unit 2 may turn off the light source module 52 in association with the display of the predetermined image.

Similarly to the processing of S15 of Embodiment 1, the control unit 2 determines whether a given time elapses (S37). When determining that the given time does not elapse (S37: NO), the control unit 2 continues the display of the predetermined image and performs loop processing in order to make the determination of S37 again. When determining that the given time elapses (S37: YES), the control unit 2 ends the display of the predetermined image and turns off the power supply of the liquid crystal display 1 (S38). Needless to say, the control unit 2 executes the processing of S35 and the subsequent steps even when the liquid crystal display 1 is in the standby state. The display of the operation screen of the on-timer mode is not limited thereto, and the operation screen of the on-timer mode may be displayed by, for example, pressing a predetermined button of the operation unit 11, which is performed by the operator.

Embodiment 4

Figure 11:
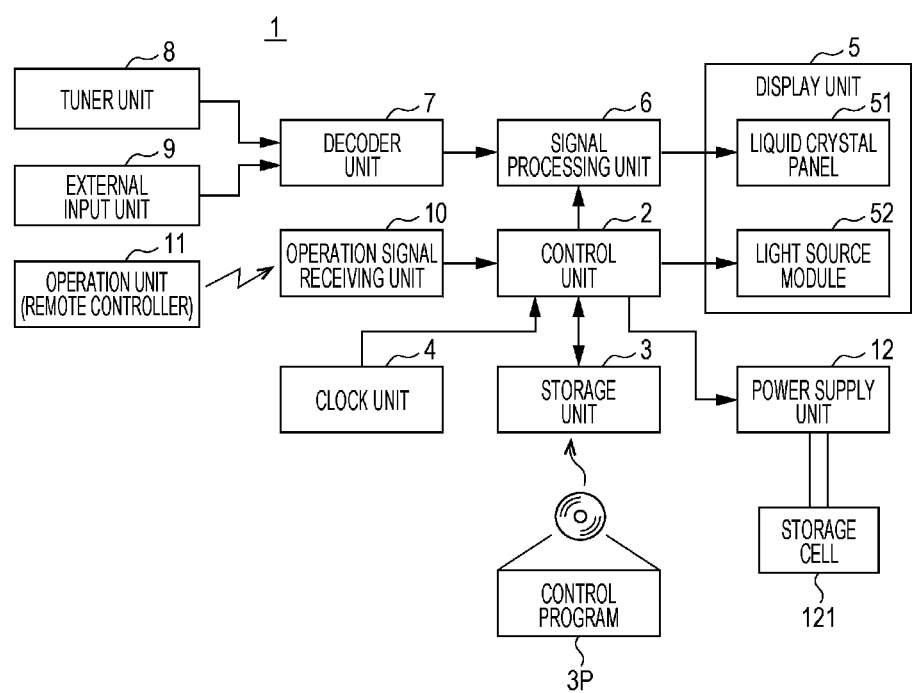
FIG. 11 is a block diagram illustrating a configuration of a liquid crystal display according to Embodiment 4.

FIG. 11 is a block diagram illustrating a configuration of the liquid crystal display 1 according to Embodiment 4. Embodiment 4 is different from Embodiment 1 in that the liquid crystal display 1 includes a storage cell 121 and the storage cell 121 is electrically connected to supply electric power to the power supply unit 12.

The storage cell 121 is a secondary cell such as a battery, and when supply of electric power from the commercial power supply is shut off, the storage cell 121 detects the shutoff of the electric power and supplies stored electric power to the liquid crystal display 1. Accordingly, even when the liquid crystal display 1 is in a state where electric power from the commercial power supply is shut off, it is possible to display the predetermined image to respond to the image sticking by the electric power supplied from the storage cell 121.

A liquid crystal display 1 according to an embodiment of the invention is a liquid crystal display including: a liquid crystal panel 51 that displays an image; a display control unit 2 that controls display of a predetermined image to respond to image sticking on the liquid crystal panel; and a selection receiving unit 2 that receives a selection of a display mode from among a plurality of display modes in which the predetermined image is displayed, in which the display control unit 2 controls the display of the predetermined image in accordance with the display mode selected at the selection receiving unit 2.

According to the embodiment of the invention, the selection receiving unit 2 is able to select a display mode from among the plurality of display modes in which the predetermined image is displayed, so that it is possible to display a screen to respond to image sticking in an appropriate display mode according to an intention of an operator. Accordingly, it is possible to achieve prevention of or recovery from an image sticking phenomenon in the liquid crystal display 1, while ensuring convenience for the operator.

In the liquid crystal display 1 according to an embodiment of the invention, the plurality of display modes includes a first mode in which the display of the predetermined image is started in a period before power supply of the liquid crystal display is turned off after the display mode is selected and a second mode in which the display of the predetermined image is started after the power supply is turned off.

According to the embodiment of the invention, it is possible to select a display mode in accordance with a mode, in which the liquid crystal display 1 is used by an operator, and thereby control the timing to start the display of the predetermined image. Accordingly, it is possible to achieve prevention of or recovery from the image sticking phenomenon in the liquid crystal display 1, while ensuring convenience for the operator.

The liquid crystal display 1 according to an embodiment of the invention includes a light source module 52 that supplies light to the liquid crystal panel 51, in which the plurality of display modes includes a light source turning-on mode in which, in a case where the predetermined image is displayed, the light source module 52 is turned on and a light source turning-off mode in which, in a case where the predetermined image is displayed, the light source module is turned off.

According to the embodiment of the invention, when the light source module 52 is turned on while the predetermined image is displayed, an effect of prevention of or recovery from the image sticking phenomenon is able to be improved, but power consumption is increased. Accordingly, the light source turning-on mode in which the light source module 52 is turned on and the light source turning-off mode in which the light source module 52 is turned off are selectable, as the plurality of display modes, in association with the display of the predetermined image, and it is thus possible to achieve prevention of or recovery from the image sticking phenomenon in the liquid crystal display 1 in accordance with an intention of an operator.

In the liquid crystal display 1 according to an embodiment of the invention, the display control unit 2 controls the display of the predetermined image in combination with the light source turning-on mode in a case where the first mode is selected, and in combination with the light source turning-off mode in a case where the second mode is selected.

According to the embodiment of the invention, in the case where the first mode is selected, by combining the first mode with the light source turning-on mode, an operator is able to easily and visually recognize that the display of the predetermined image is being executed. On the other hand, in the case where the second mode is selected, since the power supply switch of the liquid crystal display 1 is turned off and the operator does not have an intention to use the liquid crystal display 1, it is possible to suppress power consumption when the light source turning-off mode is used. Accordingly, it is possible to control the display of the predetermined image by automatically combining appropriate display modes in accordance with an intention of the operator.

In the liquid crystal display 1 according to an embodiment of the invention, the predetermined image is an image in which a white color is displayed on the whole screen.

According to the embodiment of the invention, the image in which the white color is displayed on the whole screen is able to improve the effect of prevention of or recovery from the image sticking phenomenon. Accordingly, it is possible to efficiently achieve prevention of or recovery from the image sticking phenomenon in the liquid crystal display 1.

In the liquid crystal display 1 according to an embodiment of the invention, the plurality of display modes includes a multiscreen mode in which a screen of the liquid crystal panel 51 that displays the image is divided into a plurality of regions, the predetermined image is displayed in any of the plurality of regions, and an image other than the predetermined image is displayed in another region or other regions of the plurality of regions.

According to the embodiment of the invention, when an operator selects the multiscreen mode, it is possible to display the predetermined image in any of the divided regions and display an image other than the predetermined image in the other region or regions. Accordingly, while the predetermined image is displayed in any of the regions, it is possible to display normal video or the like in the other region, thus making it possible to achieve prevention of or recovery from the image sticking phenomenon in the liquid crystal display 1, while ensuring convenience for the operator.

In the liquid crystal display 1 according to an embodiment of the invention, the plurality of display modes includes an on-timer mode in which time to start the display of the predetermined image is set, and the display control unit 2 controls the display of the predetermined image in accordance with the time set in the on-timer mode.

According to the embodiment of the invention, when an operator selects the on-timer mode, it is possible to start the display of the predetermined image at the set time. Accordingly, it is possible to start the display of the predetermined image in time, for example, such as in the middle of the night, during which the liquid crystal display 1 is not used, and it is thus possible to achieve prevention of or recovery from the image sticking phenomenon in the liquid crystal display 1, while ensuring convenience for the operator.

In the liquid crystal display 1 according to an embodiment of the invention, in a case where the predetermined image is displayed, the display control unit 2 controls the display by overlapping, with the predetermined image, information related to an elapsed time from a time point when the display of the predetermined image is started or related to a remaining time until the display of the predetermined image is ended.

According to the embodiment of the invention, it is possible to cause an operator to recognize the elapsed time from the time point when the display of the predetermined image is started or the remaining time until the display of the predetermined image is ended, while the predetermined image is displayed. Accordingly, it is possible to achieve prevention of or recovery from the image sticking phenomenon in the liquid crystal display 1, while ensuring convenience for the operator.

The liquid crystal display 1 according to an embodiment of the invention includes a light source module 52 that supplies light to the liquid crystal panel 51, in which the display control unit 2 turns on the light source module 52 with maximum light emission luminance, in a case where the predetermined image is displayed.

According to the embodiment of the invention, when the predetermined image is displayed and, in addition, the light source module 52 is turned on with maximum light emission luminance, it is possible to improve the effect of prevention of or recovery from the image sticking phenomenon.

A liquid crystal television receiver 1 according to an embodiment of the invention includes the liquid crystal display 1 according to an embodiment of the invention.

According to the embodiment of the invention, it is possible to provide the liquid crystal television receiver 1 that is capable of achieving prevention of or recovery from the image sticking phenomenon in the liquid crystal display 1, while ensuring convenience for an operator.

The embodiments disclosed here are to be considered in all respects as illustrative and not limiting. The scope of the invention is indicated by the scope of claims rather than by the foregoing meanings, and the meaning equivalent to the scope of the claims and all changes within the scope are intended to be encompassed therein.

The invention claimed is:

1. A liquid crystal display comprising:
a liquid crystal panel that displays an image; and
a processor that controls display of a predetermined image in response to image sticking on the liquid crystal panel, wherein:
the processor receives a selection of a display mode from among a plurality of display modes in which the predetermined image is displayed;

the processor controls the display of the predetermined image in accordance with the display mode selected at the processor;

the plurality of display modes includes:

a multiscreen mode in which a screen of the liquid crystal panel that displays the image is divided into a plurality of regions, the predetermined image is displayed in any of the plurality of regions, and an image other than the predetermined image is displayed in another region or other regions of the plurality of regions; and one or more regions in which the image other than the predetermined image is displayed are set based on the selection of the display mode, or the one or more regions in which the image other than the predetermined image is displayed are rotated when a given time passes; and in a case where the predetermined image is displayed, the processor controls the display by overlapping, with the predetermined image, information related to an elapsed time from a time point when the display of the predetermined image is started or related to a remaining time until the display of the predetermined image is ended.

2. The liquid crystal display according to claim 1, wherein the plurality of display modes further includes:

a first mode in which the display of the predetermined image is started in a period before power supply of the liquid crystal display is turned off after the display mode is selected; and a second mode in which the display of the predetermined image is started after the power supply is turned off.

3. The liquid crystal display according to claim 1, further comprising:

a light source module that supplies light to the liquid crystal panel, wherein the plurality of display modes further includes:

a light source turning-on mode in which, in a case where the predetermined image is displayed, the light source module is turned on; and a light source turning-off mode in which, in a case where the predetermined image is displayed, the light source module is turned off.

4. The liquid crystal display according to claim 3, wherein the plurality of display modes further includes:

a first mode in which the display of the predetermined image is started in a period before power supply of the liquid crystal display is turned off after the display mode is selected; and a second mode in which the display of the predetermined image is started after the power supply is turned off, and the processor controls the display of the predetermined image in combination with the light source turning-on mode in a case where the first mode is selected, and in combination with the light source turning-off mode in a case where the second mode is selected.

5. The liquid crystal display according to claim 1, wherein the predetermined image is an image in which a white color is displayed on a whole screen.

6. The liquid crystal display according to claim 1, wherein the plurality of display modes further includes an on-timer mode in which time to start the display of the predetermined image is set, and the processor controls the display of the predetermined image in accordance with the time set in the on-timer mode.

7. The liquid crystal display according to claim 1, further comprising a light source module that supplies light to the liquid crystal panel, wherein the processor turns on the light source module with maximum light emission luminance, in a case where the predetermined image is displayed.

8. A liquid crystal television receiver comprising the liquid crystal display according to claim 1.

* * * * *